ns// US009263000B2

(12) United States Patent
Kilgariff

(10) Patent No.: US 9,263,000 B2
(45) Date of Patent: Feb. 16, 2016

(54) LEVERAGING COMPRESSION FOR DISPLAY BUFFER BLIT IN A GRAPHICS SYSTEM HAVING AN INTEGRATED GRAPHICS PROCESSING UNIT AND A DISCRETE GRAPHICS PROCESSING UNIT

(71) Applicant: NVIDIA Corporation, Santa Clara, CA (US)

(72) Inventor: Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 72 days.

(21) Appl. No.: 14/162,591

(22) Filed: Jan. 23, 2014

(65) Prior Publication Data

US 2015/0206511 A1 Jul. 23, 2015

(51) Int. Cl.
*G09G 5/36* (2006.01)
*G06T 1/20* (2006.01)
*H04N 19/423* (2014.01)

(52) U.S. Cl.
CPC *G09G 5/363* (2013.01); *G06T 1/20* (2013.01); *H04N 19/423* (2014.11); *G09G 2360/06* (2013.01)

(58) Field of Classification Search
None
See application file for complete search history.

(56) References Cited

U.S. PATENT DOCUMENTS

| | | | |
|---|---|---|---|
| 6,557,065 B1 * | 4/2003 | Peleg et al. | 710/300 |
| 8,199,155 B2 | 6/2012 | Leroy et al. | |
| 8,432,407 B2 | 4/2013 | Noyle | |
| 8,570,331 B1 | 10/2013 | Wyatt et al. | |
| 2001/0034222 A1 * | 10/2001 | Roustaei et al. | 455/403 |
| 2007/0139422 A1 * | 6/2007 | Kong et al. | 345/502 |
| 2009/0207195 A1 * | 8/2009 | Chin et al. | 345/699 |
| 2009/0279601 A1 * | 11/2009 | Strom et al. | 375/240.01 |
| 2011/0025696 A1 * | 2/2011 | Wyatt et al. | 345/502 |
| 2011/0161675 A1 * | 6/2011 | Diard | 713/189 |
| 2012/0105452 A1 | 5/2012 | Diard | |
| 2013/0097220 A1 * | 4/2013 | Lyons et al. | 709/203 |
| 2013/0148720 A1 * | 6/2013 | Rabii | 375/240.12 |

\* cited by examiner

Primary Examiner — Joni Richer
(74) Attorney, Agent, or Firm — Zilka-Kotab, PC

(57) ABSTRACT

A graphics system includes an integrated graphics processor and a discrete graphics processing unit. An intra-system bus coupled data from the discrete graphics processing unit to the integrated graphics processor. In a high performance mode the discrete graphics processing unit is used to render frames. Compression techniques are used to aid in the data transfer over an intra-system bus interface.

15 Claims, 5 Drawing Sheets

LEVERAGING COMPRESSION FOR DISPLAY BUFFER BLIT IN A GRAPHICS SYSTEM HAVING AN INTEGRATED GRAPHICS PROCESSING UNIT AND A DISCRETE GRAPHICS PROCESSING UNIT

FIELD OF THE INVENTION

The present invention is generally related to the operation of a graphics processing system having two different graphics processors, such as an Integrated Graphics Processor (IGP) and a discrete Graphics processing unit (dGPU).

BACKGROUND OF THE INVENTION

FIG. 1 illustrates a hardware implementation of graphics processing solution developed for Notebook Computer technology by the Nvidia Corporation, which is known by the product name of Optimus™ An Integrated Graphics Processor (IGP) chip includes a central processing unit (CPU), graphics processing unit (GPU), and a memory controller hub (MCH). A Platform Controller Hub (PCH) may be optionally included to support driving displays with different interface standards, such as LVDS, VGA, and DP/HDMI. As illustrative examples, the IGP chip may be an Intel chip such as the Intel core 15 or core 17 chips. Alternatively the IGP chip may be an AMD A4, A6, A10, or A8 chip. The IGP chip is coupled to a system memory.

A discrete GPU (dGPU) is coupled to the IGP via a Peripheral Component Interface (PCIe) link. The dGPU may, for example, be an Nvidia GPU. The dGPU is coupled to a local memory.

As illustrated in FIG. 2, the process flow may be varied to have either the dGPU 201 or the IGP 202 render the graphics image. An application is launched 205 and a routing decision 210 is made regarding which processor will perform the rendering of a frame 220. If the dGPU is used, the dGPU is used for the rendering and a fast GPU initiation is implemented 215. A copy engine 218 in the dGPU may be used to facilitate copying the rendered image to the system memory of the IGP. Display hardware 250 in the IGP displays the rendered frames on a display 260. The process flow has the routing selected to achieve the best performance or best battery life depending on application. The dGPU has the advantage of superior graphics processing capabilities with respect to the IGP. However, using the dGPU also consumes more power than rendering images with the IGP. Consequently, battery lifetime is reduced when the dGPU is used to render images. In mobile environments, the process flow is selected so that the dGPU is activated and used to render only the more demanding graphics processing operations, such as games, media, and GPU computing. The dGPU is shut off when there are less demanding graphics processing operations that can be handled by the IGP, such as processing the graphics of documents and surfing the Web.

When the dGPU is utilized to render images, a blit operation occurs to transfer the final displayable buffer to the system memory of the IGP, and then the IGP provides the rendered image to a display. This blit operation is performed via the PCIe interface.

The inventor of the present application has discovered that several industry trends may make it difficult to continue to use the Optimus™ solution in the future, at least for the low-cost end of the market. First, one trend is that displays are increasing in resolution over time, which in turn means that the amount of data per frame is increasing. Second, there are cost pressures on IC companies to reduce the bandwidth of the PCIe bus. For example, to reduce costs, Intel has reduced the PCIe bandwidth from sixteen lanes to four lanes for some IGPs. The PCIe bandwidth might even be reduced to two lanes at some point in the future. If these two trends continue, then at some point in time there will be insufficient bandwidth for the blit operation to be performed at acceptable frame rates, at least for the lower-cost IGPs.

Thus, what is desired are new approaches to operate a multi-graphics processing system having an IGP and a dGPU.

SUMMARY OF THE INVENTION

A graphics system includes an integrated graphics processor and a discrete graphics processing unit. An intra-system bus interface permits frame data of an image to be transferred from the discrete graphics processing unit to the integrated graphics processing unit. Compression techniques are leveraged to extend the capabilities of the graphics system to operate with high resolution displays and/or lower bandwidth intra-system bus implementations. In one embodiment industry standard compression and decompression techniques are used which leverage off of video encoders and decoders of the graphics system.

In one embodiment a method is applied to operating a multi-graphics processing system with a limited intersystem bus bandwidth less than that required to transfer uncompressed frames at a frame rate of the multi-graphics processing system. The method includes rendering a frame in a discrete graphics processing unit, compressing the rendered frame via a video encoder of the discrete graphics processing unit, and copying the compressed rendered frame, via an intra-system bus, to a frame buffer of a CPU chip having an integrated graphics processor and a video decoder. The CPU chip decompresses the compressed rendered frame from the frame buffer via the video decoder and displays the frame on a display.

An embodiment of a multi-graphics system includes a CPU chip having a CPU, display controller, integrated graphics processing unit, and a video decoder. A system memory of the CPU chip includes a frame buffer. The system includes a discrete graphics processing unit (dGPU) having a video encoder and a graphics processing core. An intra-system bus couples data from the dGPU to the frame buffer. The system is configured so that dGPU in a high performance mode renders frames of images, compresses the frames via the video encoder, and transfers the compressed frames to the frame buffer of the CPU chip via the intersystem bus. The CPU chip utilizes the video decoder to decompress the compressed frames for display.

DETAILED DESCRIPTION

Figure 1:
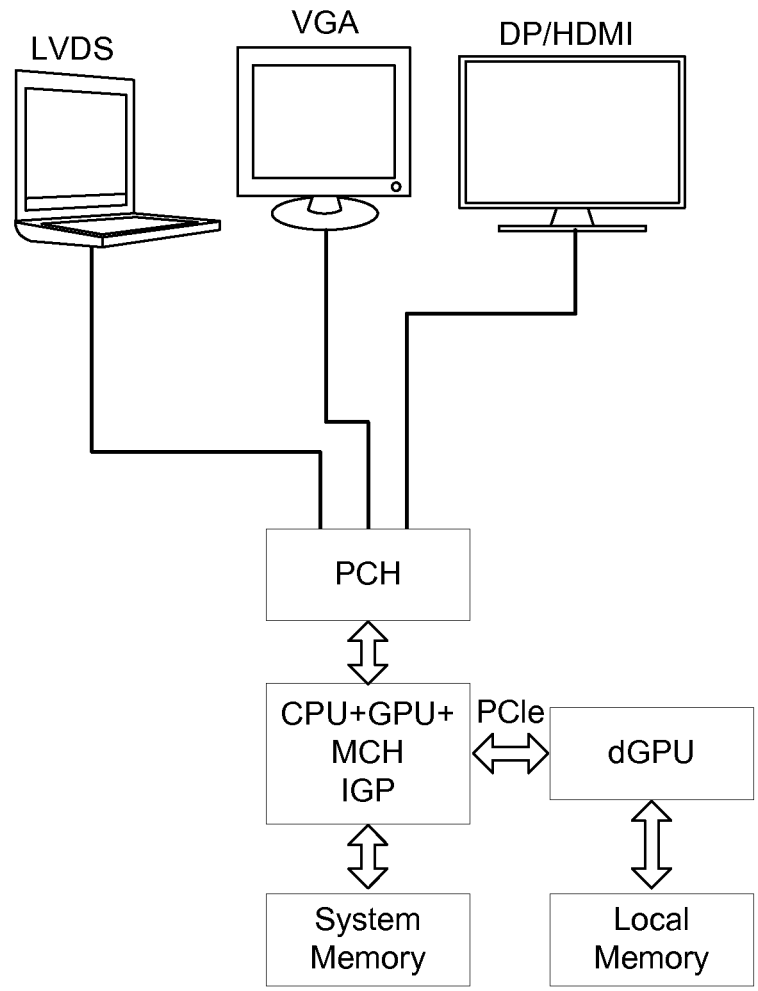
FIG. 1 is a block diagram of a prior art graphics system combining an integrated graphics processor with a discrete graphics processing unit.
Figure 2:
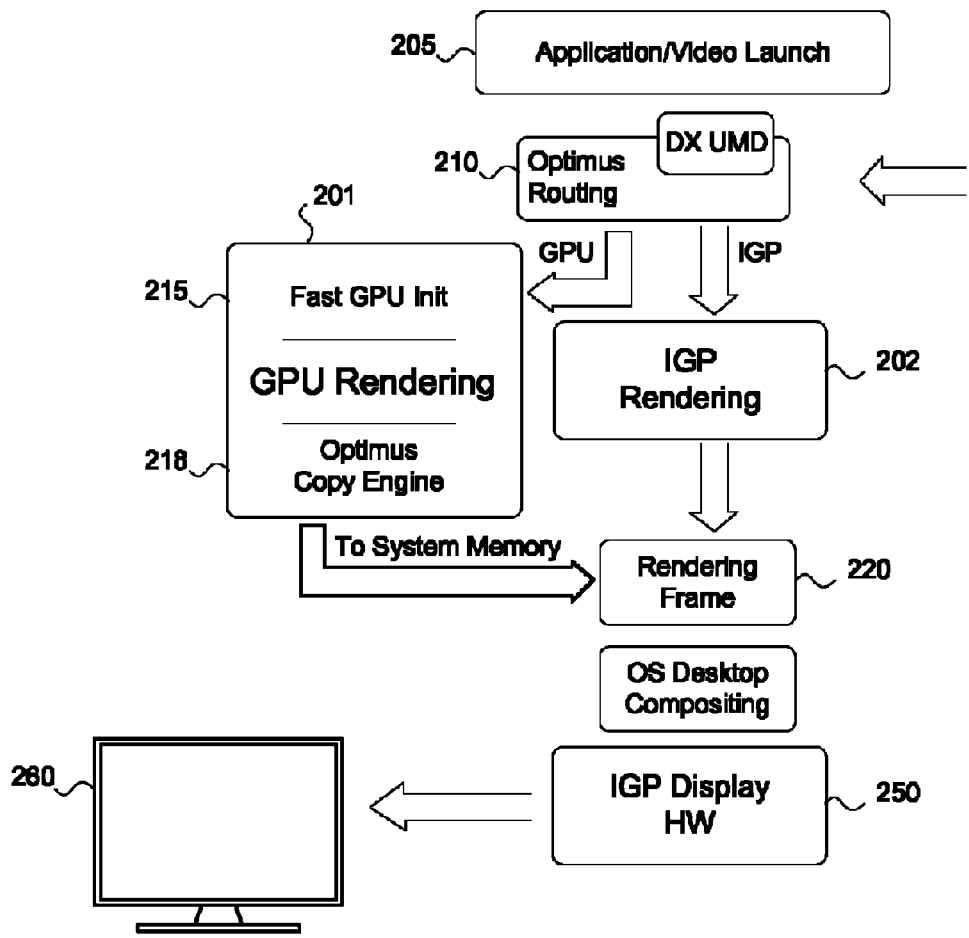
FIG. 2 illustrates a process flow view of the system of claim 1, showing different rendering options
Figure 3:
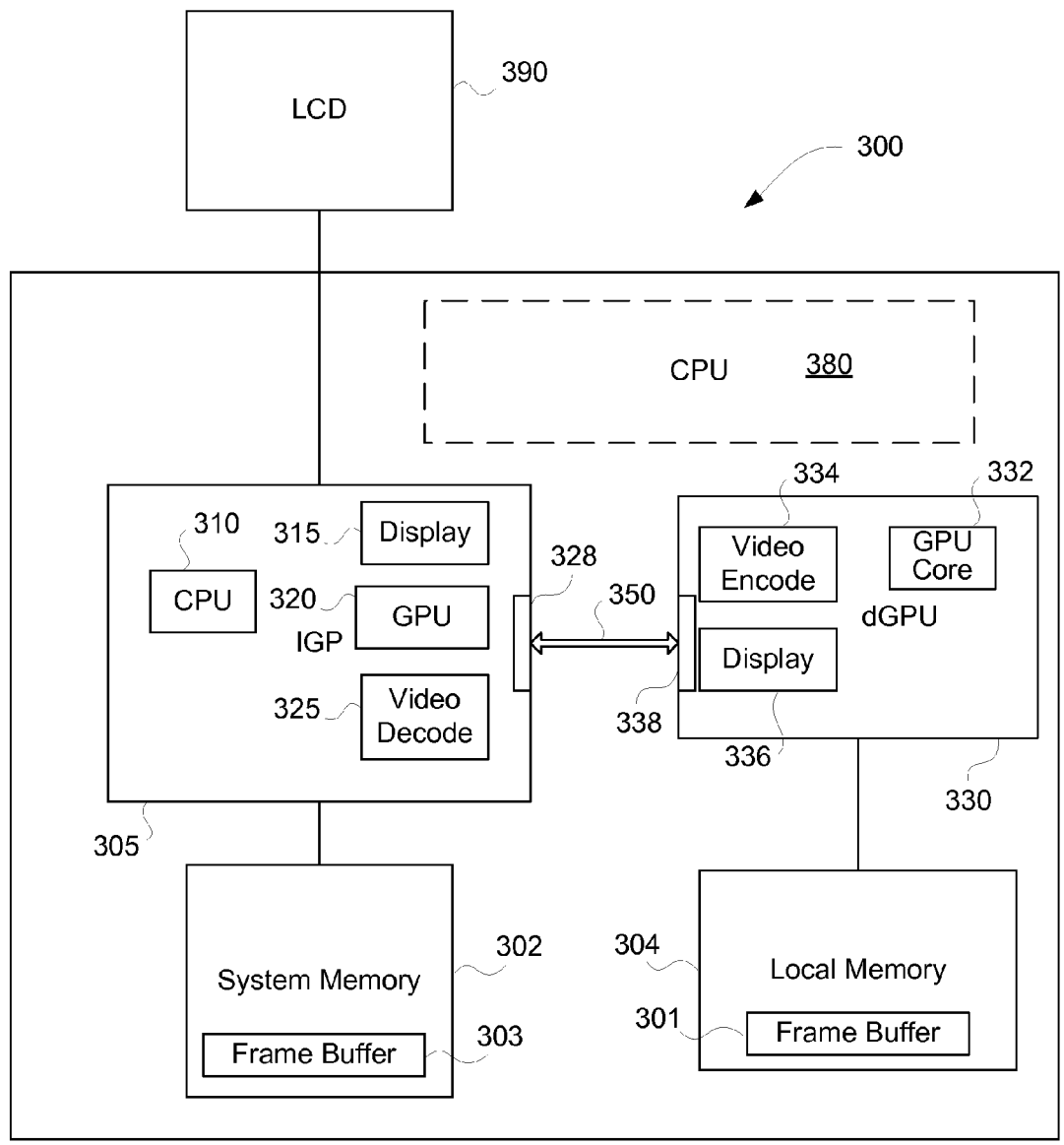
FIG. 3 is a block diagram illustrating a graphics system in accordance with an embodiment of the present invention.

FIG. 3 is a block diagram of a multi-graphics processor system 300 that has a first processor 305 that contains an integrated graphics processor (IGP) 320. The first processor 305 includes a Central Processing Unit (CPU) 310, display controller 315, integrated graphics processor 320 (also commonly described as an integrated graphics processing unit, (iGPU)), and a video decoder 325. The first processor 305 may be implemented as a chip, and is often described as a CPU chip with an IGP, or as an IGP chip. Hereinafter the first processor 305 is described as a CPU chip. The CPU chip 305 has a system memory 302 that includes a region of memory used as a frame buffer 303 for the IGP 320. The CPU chip 305 may be a standard Intel or AMD chip having an IGP, such as an Intel core 15, core 17 chips and AMD A4, A6, A8, and A10 products.

A second processor 330 is a discrete graphics processing unit (dGPU). In some embodiments the CPU chip 305 and dGPU 330 are part of a chipset resident on a motherboard. The dGPU 330 includes its own local memory, 304 which may also have a region allocated to serve as a frame buffer 301 to temporarily store a rendered graphics frame data prior to transfer to the frame buffer 303 of the system memory 302.

The dGPU 330 includes a GPU core 332, display controller 336, and a video encoder 334. The GPU core 332 of the dGPU 330 may include conventional hardware and software to perform graphics operations such as shader modules, system memory rasterization, or other advanced graphics hardware and software. The dGPU 330 may include other conventional dGPU components, interfaces, and software.

Bus interfaces 328 and 338 support an intra-system bus 350 between the dGPU 330 and the IGP 320 of the CPU chip 305. The intra-system bus 350 may, for example, be a Peripheral Component Interface Express (PCIe) interface with a standard number of data lanes, such as a x2 (2 lanes), x4 (4 lanes), or a x16 (16 lanes). Decreasing the number of data lanes decreases the manufacturing cost but also decreases the bandwidth. Additionally, there are different speeds for PCIe (e.g., Gen 1, Gen 2, and Gen3, where each successive generation has twice the clock rate). The faster clocks burn more power and increase Input/Output (IO) size, leading to another manufacturing tradeoff. It will also be understood that other types of data buses may be used besides PCIe.

The multi-graphics processor system 300 monitors graphics demand and determines whether the IGP 320 or the dGPU 330 renders a frame. It will be understood that the CPU 310 may act as a controller and perform management functions and/or client server functions. However, it will be understood that the multi-graphics processor system may also be integrated into a larger system optionally having one or more additional processors or other chips, such as a processor 380 to perform controller, management, or other functions.

In a power savings mode, the dGPU 330 may be switched off and the IGP 320 renders frames of images. In a high performance mode the dGPU 330 renders a frame of an image and copies the rendered frame into the shared frame buffer 303 of system memory 302 so that it may be outputted under the control of the CPU chip 305 to a display 390. It is noted that the display block 336 in the dGPU 330 is an optional feature and not necessary for practicing embodiments of the present invention.

In accordance with an embodiment of the present invention, compression is used to aid in performing the display buffer blit from the dGPU 330 to the IGP 320. A video encoder 334 in the dGPU 330 is used to compress frames that are sent over the interface. The copying (blit) operation may be performed over the intra-system bus 350 using, for example, a direct memory access (DMA) process to perform the transfer. Alternately, the video encoder 334 may perform the write. The video encoder 334 may utilize an industry standard compression algorithm such as H.264, H.265, VP8 and VP9. Many compression algorithms permit up to a tenfold compression in data size. Consequently, this relaxes the requirements on the intra-system bus 350 when the dGPU 330 is used to render frames and the frames are transferred to the CPU chip 305 for display. This permits, for example a x2 PCIe interface to be used to send compressed rendered frames from the dGPU 330 to the frame buffer memory 303 over a PCIe interface. The video decoder 325 of the CPU chip 305 then decodes the frame and the display module 315 is used by the IGP 320 to display the frame on a display 390.

Compression is particularly important if the bandwidth of the interface is marginal or below that required to transfer uncompressed frames at standard system frame rates used in graphics systems and displays. The amount of data in an individual frame will depend on the screen resolution and other factors. If the bandwidth is below a threshold level then it is impractical to send uncompressed frames from the dGPU 330 to the IGP 320 over the interface at standard system frame rates used in consumer systems, such as notebook computers.

The compression permits the dGPU 330 to be used with a greater variety of CPU chips 305 having an IGP, including those in which the intra-system bus 350 has a comparatively small bandwidth. Additionally, compression permits the graphics system to be operated with higher resolution displays. However, to provide a pleasant user experience the latency should be comparatively low. For example, a latency of greater than 300 milliseconds may be noticeable to an end user.

One aspect of the present invention is that it may be implemented in a very cost-effective and power-efficient manner by leveraging off of the industry-standard compression/decompression modules that are typically included and used for other unrelated purposes. As the video encoder 334 may be used for other purposes, the compression of the rendered frame data does not add to the hardware cost of a dGPU that already includes a video encoder. As virtually all of the industry-standard CPU chips having an IGP include a video decoder 325, there is no additional hardware cost. Using standard compression algorithms also means that the compression/decompression can take place without requiring waking up one or more CPUs and burning lots of power to perform non-standard compression and decompression algorithms. Moreover the CPU cores used in many consumer products designed to run off of battery power are typically not fast enough to decompress effectively.

Another aspect of the present invention is that the use of compression may be selectively utilized when it is required. In some applications a display with a fixed resolution is chosen at the time of manufacture. However, in other applications it is possible that the graphics system may support the use of displays with different screen resolutions such that the amount of data per frame may vary in use. In this example, the system may detect the data requirements per frame and instruct the dGPU to initiate compression of graphics data rendered by the dGPU when it is necessary based on the bandwidth of the intra-system bus and the amount of data per rendered frame that needs to be transferred from the dGPU to the IGP.

Figure 4:
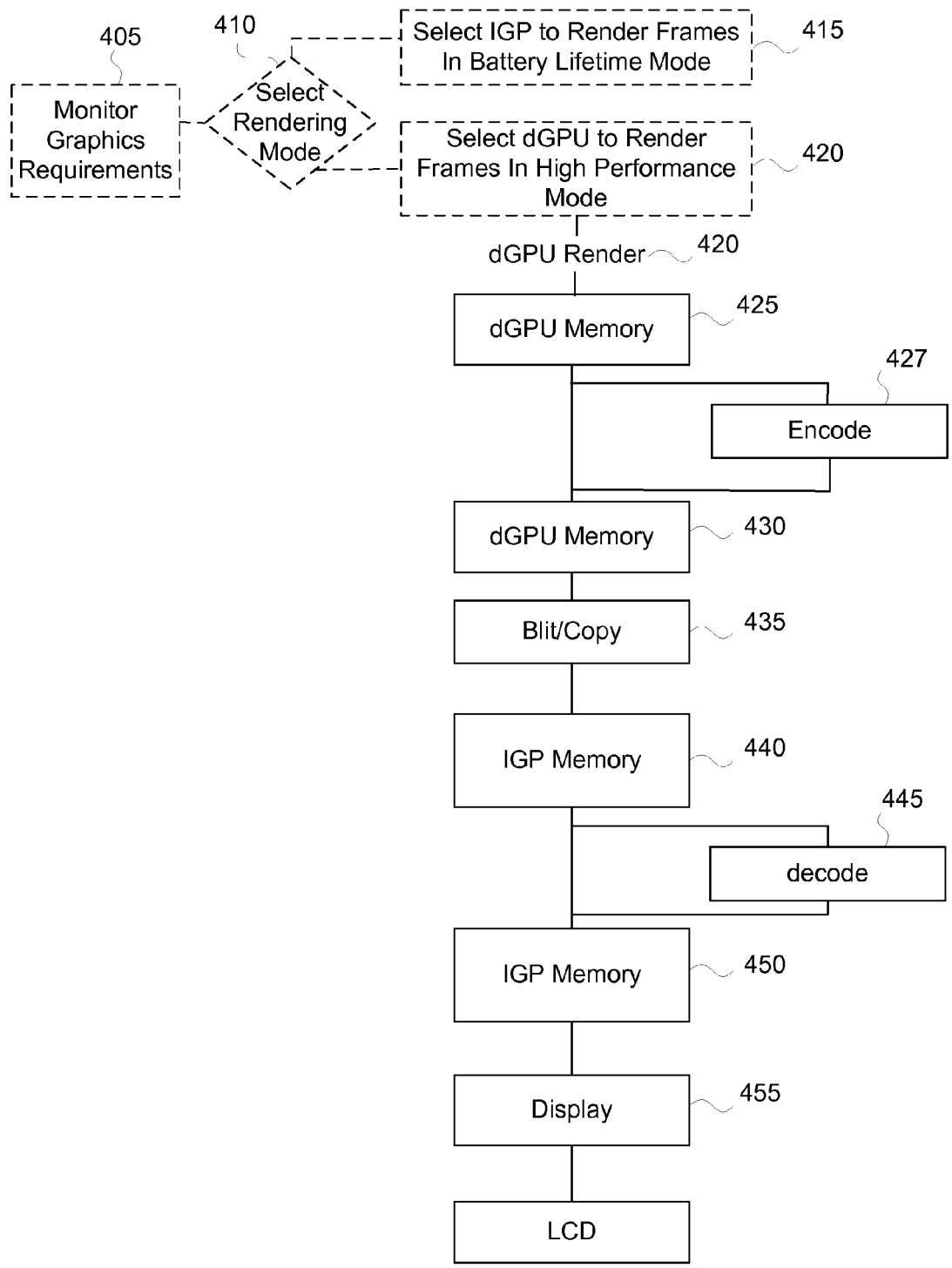
FIG. 4 illustrates a method in accordance with an embodiment of the present invention.

FIG. 4 illustrates a method in accordance with an embodiment of the present invention. The present invention can be used in the context of a system having two modes of operation, depending on graphics requirements. In step 405, the system monitors graphics needs and selects a rendering mode 410. In a battery lifetime mode, the IGP 320 is selected to render the frames 415. In a performance mode, the dGPU is selected to render the frames 420. Steps 405, 410, and 415 are illustrated in dashed lines to indicate that they are conventional steps.

In the performance mode, the dGPU renders 420 a frame. The rendered frame is sent to a dGPU memory for temporary storage 425. The frame is encoded 427 and may be copied back to the dGPU memory 430. The encoded (compressed) frame is then copied 435 to a frame buffer portion of the IGP system memory 440. The IGP then decodes 445 the compressed frame, which may be returned to the IGP memory. The IGP 320 then uses the display controller 315 to display 455 the frame on a display, such as on a LCD display.

Figure 5:
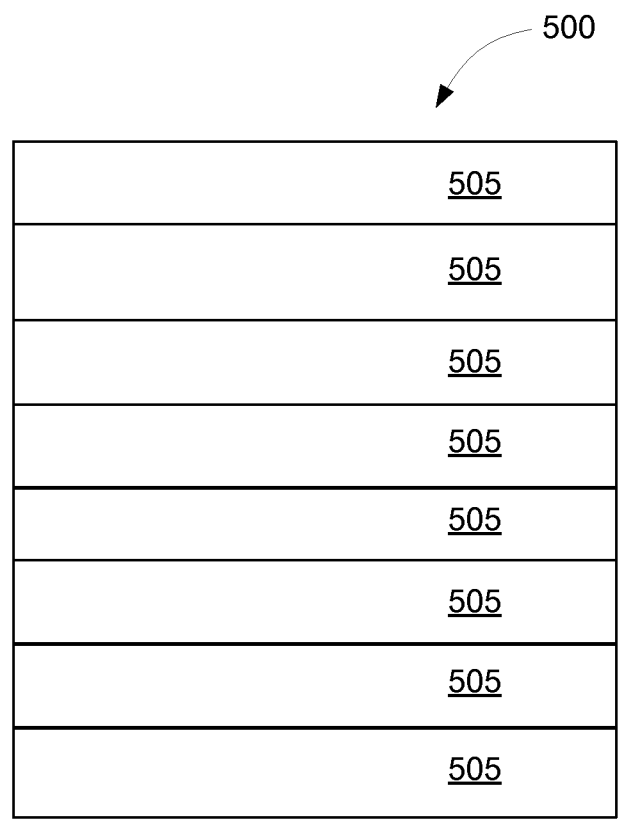
FIG. 5 illustrates an implementation detail to reduce latency of the system in accordance with an embodiment of the present invention.

FIG. 5 illustrates a technique to reduce latency in accordance with an embodiment of the present invention. In this embodiment, the dGPU breaks apart an individual rendered frame 500 into sub-frames 505. The frame is rendered and then the sub-frames 505 are encoded individually and then individually copied to the system memory, which in turn are then decoded after they are received. Individual sub-frames may be individually encoded, transferred, and decoded in a pipeline sequence to reduce latency. This permits, for example, the dGPU 330 to be working on encoding a sub-frame while the video decoder 325 of CPU chip 305 is working on decoding the previously encoded sub-frame. For example, consider the situation of two sub-frames, sub-frame 0 and sub-frame 1. Suppose the dGPU encodes sub-frame 0 and then ships it to the frame buffer 303. While the dGPU is working on encoding sub-frame 1, the video decoder 325 of the CPU chip 305 can start decoding the sub-frame 0. This can be extended to an arbitrary number of sub-frames. Thus a pipeline sequence is created in which the dGPU is working on encoding and transferring sub-frame "n" while the CPU chip 305 works on decoding sub-frame "n−1." In one implementation, an individual frame is divided into at least four sub-frames. Generally speaking, a range of four-to-eight sub-frames reduces latency and the benefits saturate at about eight sub-frames. Latency can be reduced by a factor of two using this technique.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of operating a multi-graphics processor system with a limited bus bandwidth, comprising:
   rendering a frame utilizing a discrete graphics processing unit (dGPU) that includes a video encoder and a graphics processing core, wherein the frame is stored in a local memory associated with the dGPU;
   compressing the frame via the video encoder; and
   copying, via an intra-system bus, the compressed frame from the local memory to a frame buffer included in a system memory associated with a processor that includes a central processing unit (CPU), an integrated graphics processing unit (iGPU), a display controller, and a video decoder,
   wherein the video decoder decompresses the compressed frame and stores the decompressed frame in the frame buffer, and
   wherein the video encoder utilizes an industry standard compression protocol to compress the frames, the industry standard compression protocol being compatible with the video decoder.

2. The method of claim 1, wherein the intra-system bus is a PCIe bus.

3. The method of claim 2, wherein the intra-system bus is a PCIe x2 bus having two data lanes for transferring data.

4. The method of claim 1, wherein compressed frames are transferred to the frame buffer via a direct memory access (DMA).

5. The method of claim 1, wherein the compression protocol used by the video encoder and the video decoder is a protocol selected from the group consisting of H.264, H.265, VP8, and VP9.

6. The method of claim 1, wherein the frames are compressed by a factor of at least ten prior to transfer over the intra-system bus.

7. The method of claim 1, wherein each frame is divided into a plurality of sub-frames, and wherein each sub-frame in the plurality of sub-frames is individually encoded by the video encoder, transferred to the frame buffer in the system memory, and decoded by the video decoder in a pipeline order.

8. A multi-graphics system, comprising:
   a processor including a central processing unit (CPU), an integrated graphics processor (IGP), a display controller, and a video decoder;
   a system memory including a frame buffer;
   a discrete graphics processing unit (dGPU) including a video encoder and a graphics processing core;
   a local memory associated with the dGPU; and
   an intra-system bus;
   wherein the dGPU is configured to render a frame and store the frame in the local memory, compress the frame via the video encoder, and transfer the compressed frame to the frame buffer via the intra-system bus, and
   wherein the video decoder is configured to decompress the compressed frames and store the decompressed frame in the frame buffer, and
   wherein the video encoder utilizes an industry standard compression protocol to compress the frames, the industry standard compression protocol being compatible with the video decoder.

9. The system of claim 8, wherein the processor and the dGPU are part of a chipset.

10. The system of claim 8, wherein the intra-system bus is a PCIe bus.

11. The system of claim 8, wherein the intra-system bus is a PCIe x2 bus having two data lanes for transferring data.

12. The system of claim 8, wherein compressed frames are transferred to the frame buffer via a direct memory access (DMA).

13. The system of claim 8, wherein the compression protocol used by the video encoder and the video decoder is a protocol selected from the group consisting of H.264, H.265, VP8, and VP9.

14. The system of claim 8, wherein the frames are compressed by a factor of at least ten prior to transfer over the intra-system bus.

15. The system of claim 8, wherein each frame is divided into a plurality of sub-frames, and wherein each sub-frame in the plurality of sub-frames is individually encoded by the video encoder, transferred to the frame buffer in the system memory, and decoded by the video decoder in a pipeline order.

* * * * *

UNITED STATES PATENT AND TRADEMARK OFFICE
CERTIFICATE OF CORRECTION

PATENT NO. : 9,263,000 B2
APPLICATION NO. : 14/162591
DATED : February 16, 2016
INVENTOR(S) : Emmett M. Kilgariff Page 1 of 1

It is certified that error appears in the above-identified patent and that said Letters Patent is hereby corrected as shown below:

In the Specification

Column 1, Line 26 please replace "core 15 or core 17" with --core I5 or core I7--;
Column 3, Line 12 please replace "core 15, core 17" with --core I5, core I7--.

In the Claims

Column 6, Line 51 please replace "compressed frames" with --compressed frame--.

Signed and Sealed this
Seventeenth Day of March, 2020

Andrei Iancu
*Director of the United States Patent and Trademark Office*